US007356804B2

(12) United States Patent
Blumenthal et al.

(10) Patent No.: US 7,356,804 B2
(45) Date of Patent: Apr. 8, 2008

(54) LANGUAGE INTEGRATED UNIT TESTING

(75) Inventors: Andreas Blumenthal, Heidelberg (DE);
Klaus Ziegler, Neidenstien (DE);
Juergen Staader, Nussloch (DE);
Andreas Simon Schmitt, Kaiserslautern (DE)

(73) Assignee: SAP Aktiengesellschaft, Walldorf (DE)

( * ) Notice: Subject to any disclaimer, the term of this patent is extended or adjusted under 35 U.S.C. 154(b) by 814 days.

(21) Appl. No.: 10/723,702

(22) Filed: Nov. 26, 2003

(65) Prior Publication Data

US 2005/0114837 A1    May 26, 2005

(51) Int. Cl.
*G06F 9/44*    (2006.01)
(52) U.S. Cl. .................. 717/124; 702/119; 702/123
(58) Field of Classification Search ........ 717/140–146, 717/124–127; 702/119, 123
See application file for complete search history.

(56) References Cited

U.S. PATENT DOCUMENTS 5,651,111 A * 7/1997 McKeeman et al. ......... 714/38

| | | | |
|---|---|---|---|
| 5,680,622 A * | 10/1997 | Even | 717/154 |
| 5,768,564 A * | 6/1998 | Andrews et al. | 717/137 |
| 6,031,993 A * | 2/2000 | Andrews et al. | 717/143 |
| 6,510,402 B1 * | 1/2003 | Logan et al. | 702/186 |
| 6,574,578 B1 * | 6/2003 | Logan | 702/122 |
| 6,601,018 B1 * | 7/2003 | Logan | 702/186 |
| 6,895,578 B1 * | 5/2005 | Kolawa et al. | 717/130 |
| 6,931,628 B2 * | 8/2005 | McGeorge, Jr. | 717/124 |
| 7,239,166 B2 * | 7/2007 | Braverman et al. | 324/765 |

OTHER PUBLICATIONS

Borland C++ 3.0 Tools & Utilities Guide, 1991, pp. 9-43.*
Code Complete, Steve McConnell, Microsoft Press, Apr. 16, 1993, pp. 95-104.*

* cited by examiner

*Primary Examiner*—Todd Ingberg
(74) *Attorney, Agent, or Firm*—Fish & Richardson P.C.

(57) ABSTRACT

Techniques for testing production code include providing a common source unit having production source code and test source code, the test source code having test methods for testing the production source code. Executable production code is produced based on the production source code and executable test code is produced based on the test source code. A global switch specifies whether to load the executable test code with the executable production code.

27 Claims, 6 Drawing Sheets

```
* 1. productive class :
* defination
class OPERATIONS definition.
   public section.
      class-methods:
         ADD importing A type I
                       B type I
               returning VALUE (RESULT) type I.
endclass.
```
— 14a

```
* implementation
class OPERATIONS implementation.
   method ADD.
      RESULT = A + B.
   endmethod.
endclass.
```
— 14b (bracket 14)

```
* 2. test class:
* definition
class TEST_OPERATIONS definition for testing.
   public section.
      methods TEST_ADD for testing.
endclass.
```
— 18a

```
* implementation
class TEST_OPERATIONS implementation.

method TEST_ADD.

*    test data: variable needed to store the result from the productive method
     data: ACTUAL_RESULT type I.

*    call the method under test:.
     ACTUAL_RESULT = OPERATIONS=>ADD( A = 3  B = 5 ).

*    compare the result with the expected value:
     CL_AUNIT_ASSERT=>ASSERT_EQUALS(
        ACT = ACTUAL_RESULT
        EXP = 8
        MSG = 'this is the message which occurs if the test failed'
     )

endmethod.
endclass.
```
— 18b (bracket 16)

FIG. 2

56
ASSERT_EQUALS ( ACT = ACTUAL RESULT

EXP = EXPECTED_RESULT
       MSG = 'this test has failed'
       QUIT = QUIT_VALUE ).
    57        58

Where QUIT_VALUE defines at which level the test flow should be interupted:
- NO: continue the current test method.
- METHOD: interrupt the current test method.
- CLASS: interrupt the test class execution.
- PROGRAM: abandon all test class executions of the currently tested program frame.

FIG. 4

LANGUAGE INTEGRATED UNIT TESTING

TECHNICAL FIELD

This invention relates to data processing, and more particularly to language integrated unit testing.

BACKGROUND

Software development is increasingly becoming complex resulting in the possibility for errors requiring costly solutions to correct. Software testing plays an important role in helping to ensure high software quality and to minimize errors. There are different kinds of testing in a software development process. For example, there is functional testing, performance testing, load or stress testing, robustness testing and installation testing. Functional testing, for example, includes unit testing, integration (or interaction) testing and acceptance testing. Here the term "unit" refers to a technique of testing only individual portions of the software system and not the complete software system as a whole.

Unit testing plays an important role in a software life cycle. Unit tests are usually written before actual production code is developed. When the production code is implemented, the test code is available to verify that the production code is working properly. Later, when the production code is modified, unit tests can help guarantee that existing functionality will not be unintentionally changed. If software errors are found after the production code has been shipped and employed in a production environment, the errors can be reconstructed using a unit test to help to fix the software code.

SUMMARY

The present invention provides methods and apparatus, including computer program products, directed to language integrated unit testing. The disclosed techniques integrate test source code into production source code without further burdening computer systems in a production environment. This involves a compiler and run time system being able to distinguish test code from production code and to use a global switch to generate executable code with or without the test code.

In an aspect, the invention features a method including providing a common source code unit including production source code and test source code, the test source code having test methods for testing the production source code, producing executable production code from the production source code and executable test code from the test source code, and providing a global switch specifying whether to load the executable test code with the executable production code into a production environment.

One or more of the following features can also be included. The method can include loading the executable production code in the production environment without the executable test code in response to a setting of the global switch. The method can include executing the executable production code in a development environment, and loading the executable test code with the executable production code in the development environment in response to a setting of the global switch. The method can include executing the executable production code in the production environment, loading the executable production code in the production environment without the executable test code in response to a setting of the global switch, changing the setting to specify that the executable test code can be to be loaded with the executable production code in the production environment, and loading the executable test code with the executable production code in the production environment, in response to the changed setting.

The production source code and the test source code can be generated using at least one of a procedural programming language including one of C, Fortran and Pascal, an object oriented programming language including at least one of a advanced business application program language (ABAP), Java programming language, C++ programming language and C# programming language.

In embodiments, the method can include checking static references from the production source code to the test source code and/or checking dynamic references from the executable production code to the executable test code. The executable production code and executable test source code can be produced using a compiler. The test source code has access to a functionality of the production source code.

The method can include synchronizing changes to the test source code and the production source code. The production source code and test source code can be implemented in a unit test environment. The common source unit can include production source code and test source code sharing a same compilation unit. The common compilation unit can include executable production code and executable test code sharing a same compilation unit. The test method can include test assertion methods providing instructions for verifying an expected state of production source code.

The disclosed techniques may realize one or more of the following advantages. Test source code and production source code can be combined in the same compilation unit. As a result, the test source code has internal and unrestricted access to the functionality of the production source code. In the past, two separate objects for test code and production code were produced such that the test code had only an external view onto the production code. In order to fully test the production code, the restriction of access rights to the production code had to be weakened. This is in contrast to information hiding concepts of modern software architecture which provides restricted access to production code functionality.

It is difficult to keep test code and production code synchronized. The test code often needs to be changed when the production code is modified. This need to change the test code can be overlooked if the test code resides somewhere in the system in a separate code unit. The developer doing the modifications must be aware of the existence of tests. If the production code and test code are in one code unit it is evident that there is test code and that the test code belongs to this production code of the same code unit.

The disclosed techniques are beneficial in the context of transport scenarios. Software is often developed on one system and distributed to other systems for use. One must guarantee that the correct version of test code is transported along with the correct version of production code. Here the test source code and production source code are embedded in the same code unit and are always transported together.

The disclosure techniques provide a solution to avoid loading the test code in a production environment. Therefore, the production code must not include references to the test code, neither statically or dynamically. This is ensured by syntax checking for static references and dynamic references.

The details of one or more embodiments of the invention are set forth in the accompanying appendices and the subsequent description below. Other features, objects, and advantages of the invention will be apparent from the description and appendices, and from the claims.

DESCRIPTION OF DRAWINGS

FIG. 2 is test source code and production source code example.
FIG. 4 is a test assertion method.

DESCRIPTION

Figure 1:
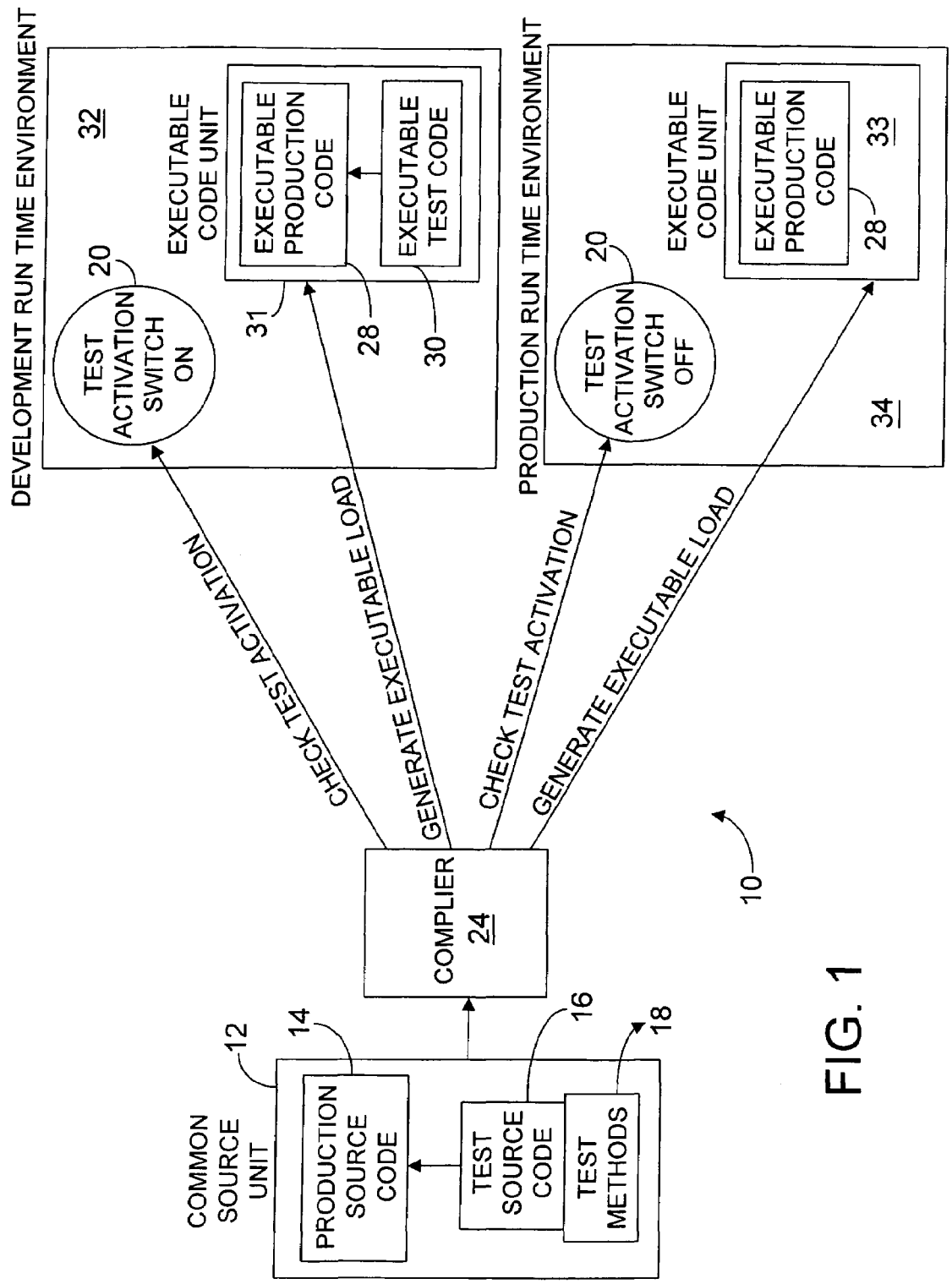
FIG. 1 is a block diagram.

FIG. 1 shows an exemplary programming environment 10. In the programming environment 10, executable production code 28 is generated from production source code 14. Executable test code 30 is generated from test source code 16.

In software development, a developer generates a common source unit 12 including production source code 14. The production source code 14 constitutes the actual software functionality (and is intended for a production environment 34 and a development environment 32). The common source unit 12 also includes test source code 16 intended for the development environment 32. The test source code 16 includes test methods 18 for testing the production source code 14. Test methods 18 are identified by a key word (test indicator), e.g., "for testing", that is an extension to a programming language, described below.

A compiler 24 converts production source code 14 and test source code 16 into executable code. During compilation, the compiler 24 checks a global switch 20 (test activation switch) to determine whether to generate an executable code unit 31 having both executable production code 28 and executable test code 30 or an executable code unit 33 with the executable production code 28 alone.

A syntax check during compilation can recognize static references from the production source code 14 to the test source code 16 and stop the compilation by producing a message indicating a syntax error. Upon receiving the syntax error, a developer can remove those static references. If the compilation proceeds with no syntax errors, the compilation generates executable code unit 31 in the development environment 32, including the executable test code 28 (if the global switch 20 is set to an "ON" state or activated). If the global switch 20 is set to an "OFF" state or deactivated (by default in the production run time environment 34), the compiler 24 generates executable code unit 33 without the executable test code 30.

To test the executable production code 28, the executable code unit 31 includes executable production code 28 and executable test code 30. The development runtime environment 32 recognizes global switch 20, executes the executable test code 30 and performs the tests directed by the executable test code 30. Because the executable test code 30 is embedded with the executable production code 28 in executable code unit 31, the executable test code 30 has unrestricted access to all functionality of the executable production code 28.

The production source code 14 must not include references to the test source code 16: if the final code is not thoroughly checked in order to prevent reference from test code 30 to production code 28 the following defect occurs. While in the development environment 32 the executable test code 30 is loaded, in the production system 34, the executable test code 30 is not loaded and attempts by the production code 28 to access test code 30 will fail because the test code 30 is not loaded in the production environment 34. This would cause runtime errors in production systems where errors must be avoided by all means but not in development systems where one tries to find all errors.

In the production environment 34, only executable production code 28 is loaded. The tests performed by the executable test code 30 are not needed during normal production usage of a software system and only used for quality assurance. If the tests are not needed, system performance is improved without loading the executable production code 28 containing executable test code 30 as memory consumption is reduced.

As described above, the syntax check function of the compiler 24 detects static references from the production source code 14 to the test source code 16. Dynamic references from the production source code 14 to the test source code 16 are detected during execution of the executable production code 28 in the production environment 34 or in the development environment 32. If the run time system of development environment 32 or production environment 34 detects such a dynamic reference, i.e., if executing production code 28 attempts to access parts, objects or functional code of the executable test code 30, then the run time system generates a runtime error aborting the running process and yielding an error message indicating the occurrence of such a dynamic reference.

An example production environment 34 includes a run time system such as a virtual machine (VM) as part of the JAVA environment from Sun Microsystems or .NET from Microsoft Corporation. Source code includes software instructions that can be written in a programming language such as a procedural programming language including C, Fortran and Pascal, an object oriented programming language such as advanced business application program language (ABAP) from SAP AG, JAVA programming language from Sun Microsystems, C++ programming language, C# programming language or other programming languages. The techniques of the programming environment 10 can be implemented for a xUnit test framework such as JUnit for JAVA programming language from Sun Microsystems and ABAP Unit for the ABAP programming language from SAP AG For example, in a JAVA or .NET environment, the compiler 24 is a separate component of the run time system producing two separate byte code units, i.e., a byte code unit (or common intermediate language code unit) for production code and a byte code unit for test code (or common intermediate language code unit).

FIG. 2 shows an example of production source code 14 and test source code 16. The production source code 14 includes software instructions for implementing an application, such as a business program for an enterprise, whereas test source code 16 includes software instructions for testing the production source code 14 in the development environment 32. The example, which is written in ABAP programming language, includes an asterisk (*) for introducing comments in plain text explaining the code and is disregarded by the compiler. The production source code 14 includes class definition 14a and class implementation 14b. The class definition 14a declares a production method ADD which is implemented in the respective class implementation 14b. In this example, the method ADD adds two import parameters A and B and yields the result in an export parameter RESULT.

The test source code 16 implements a test class. This test class includes a test class definition 18a and a test class implementation 18b. The class is defined with the extension "for testing". The extension identifies the class as a test class so that the compiler 24 can distinguish it from the production source code 14. The test class definition 18a declares a test method TEST_ADD. The extension "for testing" identifies this method as a test method. The test methods can be called from test tools of a development environment when performing the tests.

The test class implementation 18b implements the test method TEST_ADD that is declared by the class definition. The test method TEST_ADD represents a method that tests the production method ADD of the production code 14. The test method TEST_ADD calls the production method ADD with parameter values, e.g. the parameter A set to a value of "3" and the variable B set to a value of "5." The result of the call to the production method ADD is assigned to the variable ACTUAL_RESULT for subsequent comparison. The test class implementation 18b then uses the test assertion method ASSERT_EQUALS for comparing the value represented by ACTUAL_RESULT and passed to the parameter ACT with the expected value passed to the parameter EXP. This test assertion method is one of a series of assertions provided by utility class CL_AUNIT_ASSERT that is part of the ABAP programming environment. This utility class is part of the unit test framework "ABAP Unit" (Other test assertions are verified by methods from CL_AUNIT_ASSERT such as ASSERT_INITIAL, ASSERT_BOUND or just FAIL unconditionally). If the value passed to ACT is not equal to the value passed to EXP, then the test assertion method ASSERT_EQUALS generates a message with the text specified by the parameter MSG indicating that the test failed or an error has been detected. If the value of ACT is equal to the value of EXP, then the test assertion method ASSERT_EQUALS returns without generating a message MSG, indicating that the test was successful. Thus, the production method ADD, if operating properly, returns a result of "8" based on adding "3" and "5." If the production method ADD is not operating properly, the test assertion method ASSERT_EQUALS detects this failure condition and yields a warning message.

Figure 3:
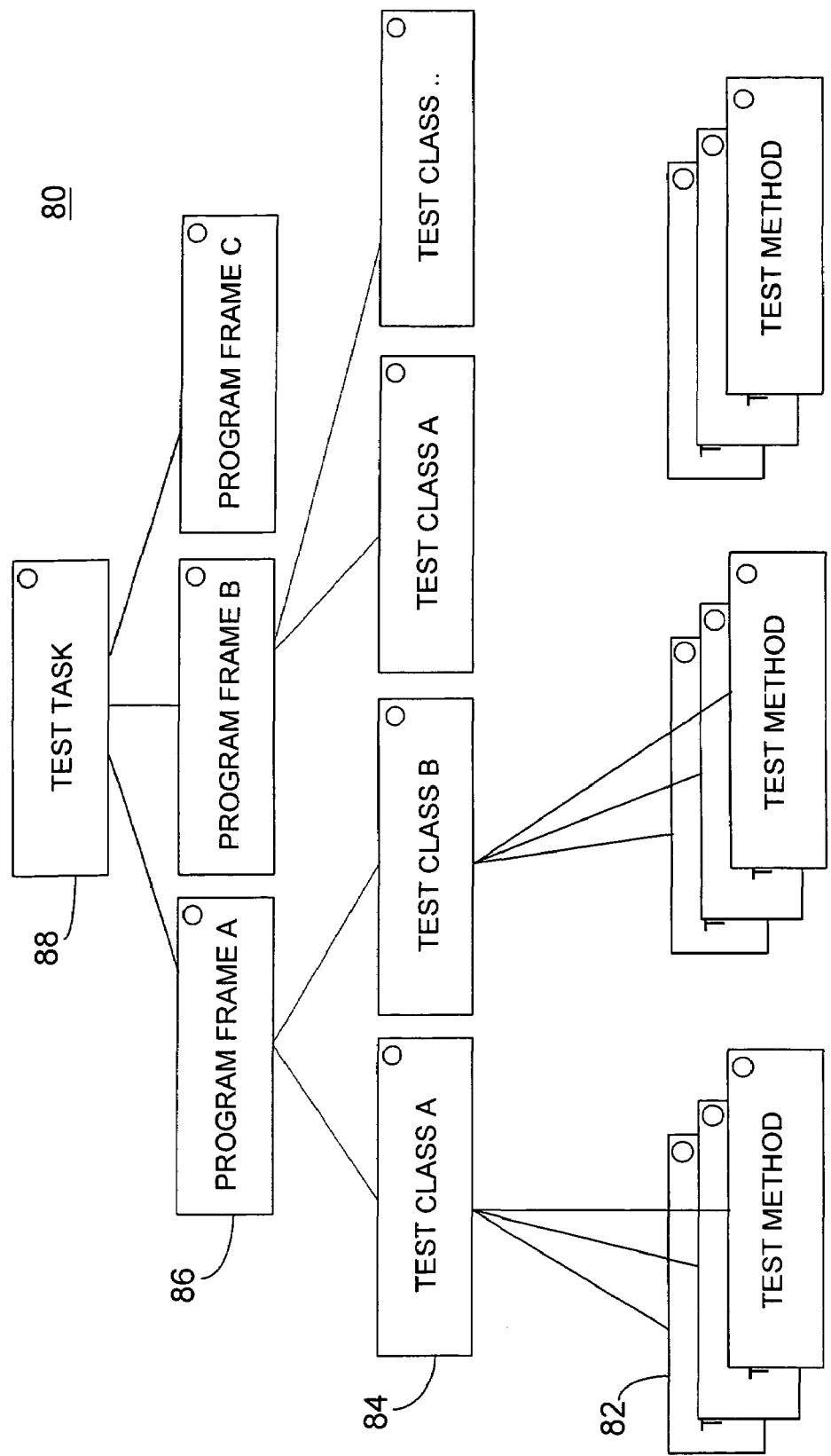
FIG. 3 is a diagram of a test hierarchy.

FIG. 3 illustrates an exemplary test hierarchy 80 for testing a program. The test hierarchy 80 is implemented in an ABAP Unit test programming environment. At a lowest level, the test hierarchy 80 provides test methods 82 having test assertion (expressed by calling the respective test assertion methods) for testing production code. The test methods 82 are part of test classes 84 which in turn are part of the program frames 86. The program frames 86 are further grouped into a test task 88. The test hierarchy 80 can be implemented using an object oriented programming language such as ABAP, JAVA, C++, C# and the other programming languages.

FIG. 4 is an exemplary call of a test assertion method ASSERT_EQUALS 56 provided by the ABAP Unit utility class CL_AUNIT_ASSERT. The method 56 can be used for verifying test assertions for the behavior of the production source code 14. A developer implements production source code 14 that, for example, performs particular operations on data and produces a result of the operations. The production source code 14 can include a method that performs an addition operation on two numbers and returns the result to a calling program. The developer may wish to test the addition operation over a range of numbers including extreme values such as zero and negative numbers. In this example, the test assertion method ASSERT_EQUALS 56 is used to compare an expected result EXP_RESULT from production code 14 with an actual result ACTUAL_RESULT returned from the production code being tested.

The test assertion method ASSERT_EQUALS 56 is similar to the test assertion method ASSERT_EQUALS in FIG. 2. However, in this example, an optional parameter 57 is supplied which otherwise is set to a default value. The optional parameter 57 provides the developer an ability to control the flow of a test execution and to decide at which level the test flow should be interrupted. The optional parameter 57 can be set to one of several constant, predefined values QUIT_VALUES 58 for controlling the flow of a test. For example, if the optional parameter 57 is set to the value of "NO" (parameter passing: QUIT=NO), then the current test method continues with the next statement inside the function regardless of whether the test assertion was triggered by an error. The default behavior (and the traditional behavior of xUnit implementations) causes an interruption of the current test method in case of a failure. This is also the case if the optional parameter 57 is set to a value of "METHOD." If the optional parameter 57 is set to a value of "CLASS," in the event of a detection of a failure, the current test class is interrupted. Likewise, if the optional parameter 57 is set to the value of "PROGRAM," then, in the event of failure detection, the execution of all test classes associated with this particular program is abandoned. As a result, test execution of a test hierarchy can be controlled when a failure condition is detected in production code.

Figure 5:
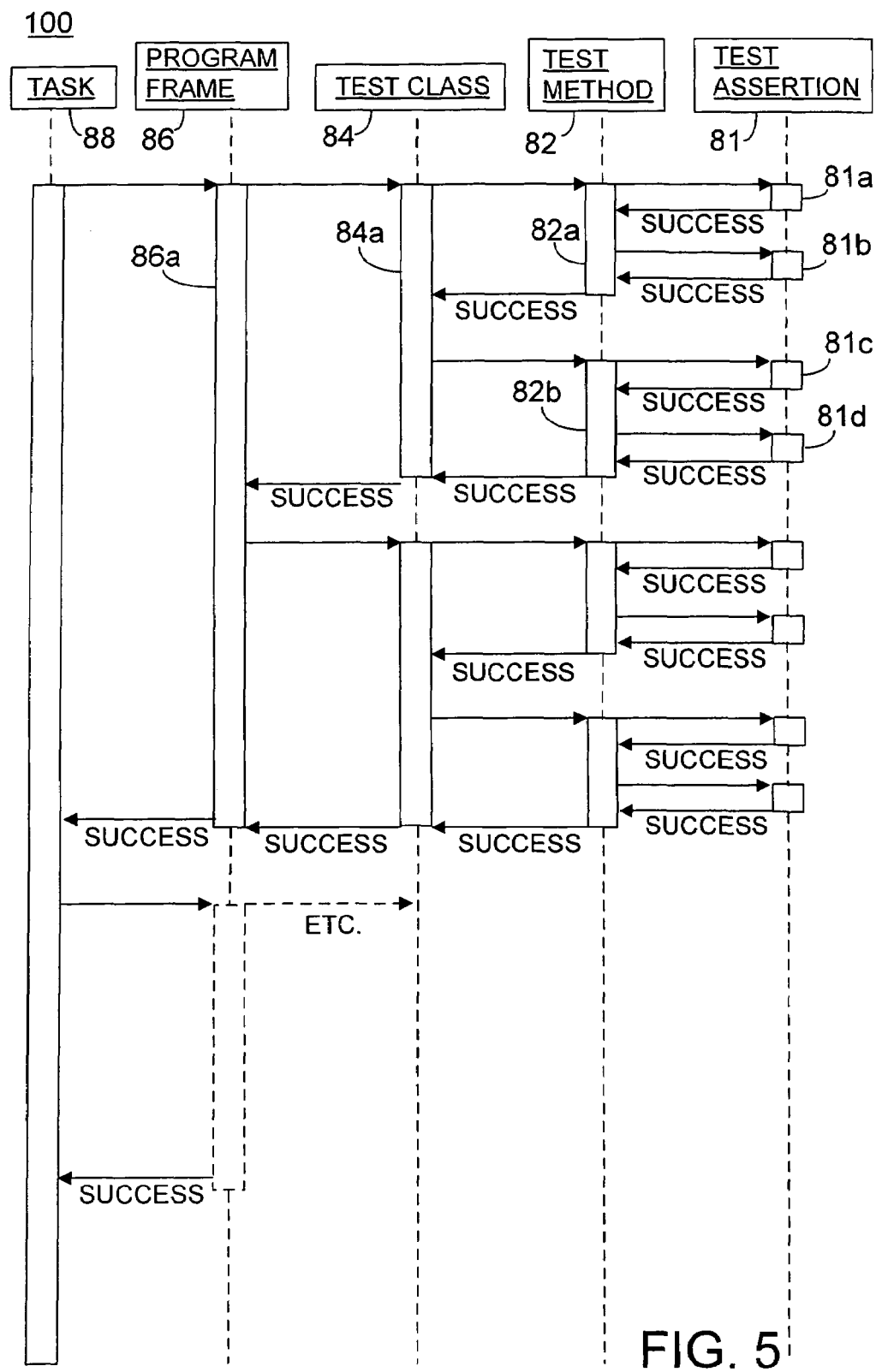
FIG. 5 is a diagram of a test sequence.

FIG. 5 shows an exemplary test sequence diagram 100 of a successful test completion of a test hierarchy as applied to production source code 14. The test sequence diagram 100 illustrates a test sequence or test flow similar to the test hierarchy 80 of FIG. 3 as it is implemented in an ABAP Unit programming environment. It should be noted that only a portion of the test hierarchy is described to simplify the discussion. The test hierarchy is organized according to a test task 88 having a program frame 86a, which in turn, further includes a test class 84a having test methods 82a and 82b. The test method 82a includes test assertions 81a and 81b. In a similar manner, test method 82b includes test assertion method calls 81c and 81d. It should also be noted that other test hierarchy configurations are possible in other programming language environments. In operation, the test hierarchy is applied to production source code to test the functionality of the code.

FIG. 5 illustrates a result of each test assertion method 81 is successful indicating that the method has not detected any failures or errors in the production source code 14. For example, the result of the execution of test assertion method 81a is successful as indicated by the reference Success. FIG. 5 illustrates that the complete test hierarchy is traversed so that all the tests are completely executed.

Figure 6:
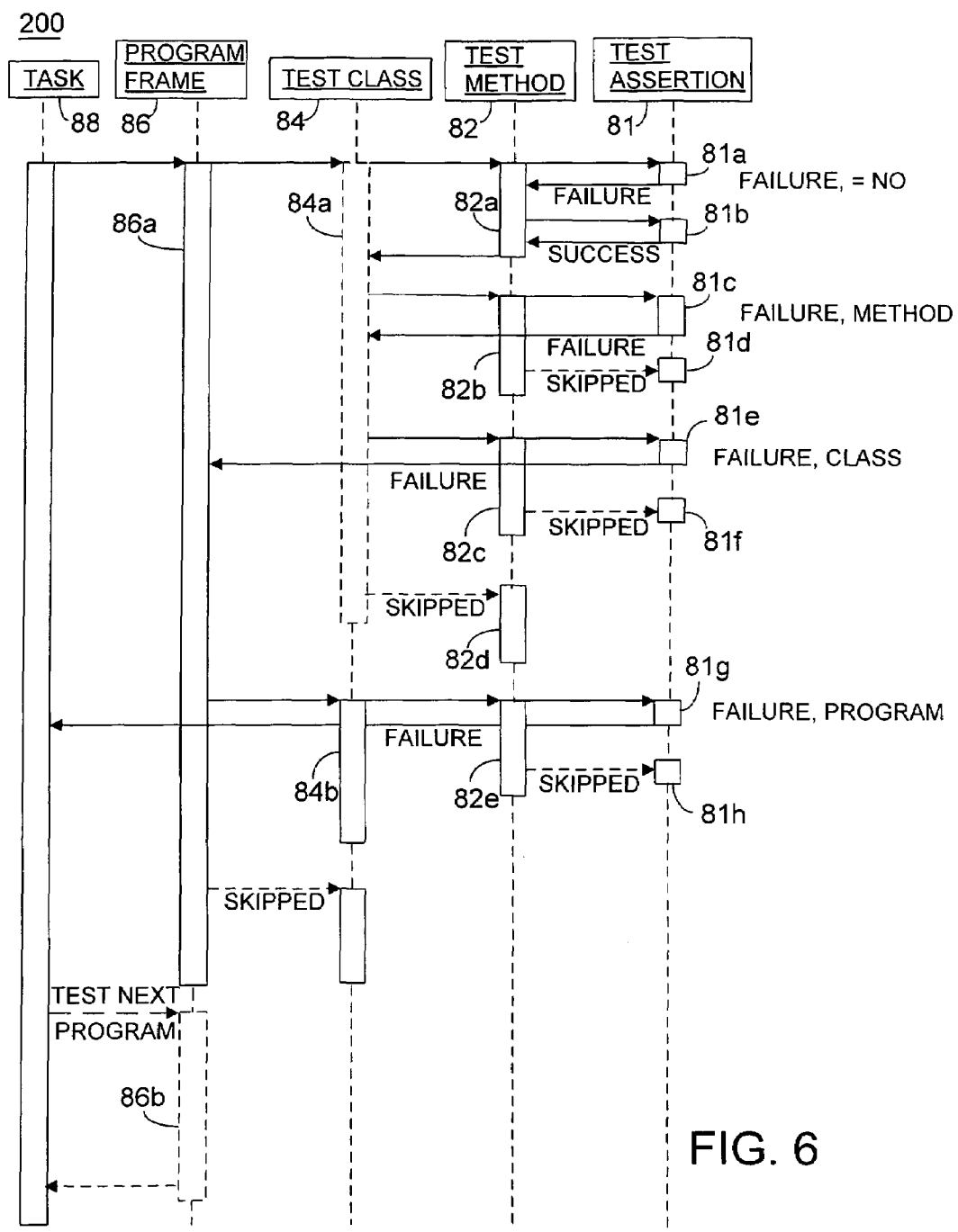
FIG. 6 is a diagram of a test sequence after detection of a failure.

FIG. 6 illustrates an exemplary test sequence diagram 200 of a test hierarchy after detection of failures in a production code. In this example, the test flow begins with the execution of test assertion method 81a. The test assertion methods called in this example can be the test assertion method ASSERT_EQUALS 56 of FIG. 4 specifying the optional parameter 57 to a value of "NO," "METHOD," "CLASS" and "PROGRAM" respectively. A failure detection condition in the production source code is indicated by the reference "Failure" and a non-failure condition is indicated by the reference "Success". A failure condition is defined when production code fails to produce an expected result. Test assertion 81a quit behavior is set to a value of "NO", specifying that if a failure is detected, the next test method should be executed, which in this case is test assertion method 81*b*. More specifically the optional parameter QUIT 57 is set to the value of NO. However, to simplify the description, setting the test assertion quit behavior to a value means setting this optional parameter to the respective value.

Since test assertion method 81*b* is successful, the test flow continues onto the next test assertion method, which is test assertion method 81*c*. Test assertion method 81*c* is associated with test method 82*b* under test class 84*a*. Test assertion method 81*c* is executed, and like test assertion method 81*b*, it also detects a failure condition. However, the test assertion 81*c* quit behavior is set to the value of "METHOD." As a result, test assertion method 81*d* is skipped and execution resumes at the next test method 82*c* with test assertion 81*e* being executed. The test assertion method 81*e* detects a failure condition. Since the value of this test assertion 81*e* quit behavior is set to a value of "CLASS," execution is forced to resume at the next test class 84*b* causing the remaining test assertion 81*f* as well as the next test method 82*d* to be skipped. Under test class 84*b*, test assertion method 81*g* is executed, which detects a failure. Since the value of test assertion 81*g* quit behavior is set to a value of "PROGRAM," testing is forced to resume at the next program frame 86*b*. As a consequence, any remaining test methods in program frame 86*a* are aborted. Thus, the above described flow control is achieved by specifying an optional parameter, in this case, the optional parameter QUIT 57.

The above is intended as an example and other configurations are possible such as providing more than one assertion method with different names instead of the optional parameter.

Embodiments of the invention can be implemented in digital electronic circuitry, or in computer hardware, firmware, software, or in combinations of them. Embodiments of the invention can be implemented as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps of embodiments of the invention can be performed by one or more programmable processors executing a computer program to perform functions of the invention by operating on input data and generating output. Method steps can also be performed by, and apparatus of the invention can be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in special purpose logic circuitry.

Other embodiments are within the scope of the following claims.

What is claimed is:

1. A method comprising:
   providing a common source code unit including production source code and test source code, the test source code having test methods for testing the production source code;
   producing executable production code from the production source code and executable test code from the test source code; and
   loading the executable test code with the executable production code in a development runtime environment in response to a setting of a global switch, wherein the development runtime environment executes the executable test code and performs the tests directed by the executable test code.

2. The method of claim 1 wherein the test source code and the production source code are written in a common programming language, and the test source code is identified by a key word that is recognized as a language extension to the common programming language.

3. The method of claim 1 wherein the executable test code includes test methods that can be called from test tools of the development runtime environment.

4. The method of claim 1 wherein the executable test code includes test methods that test production methods of the executable production code by calling production methods of the executable production code.

5. The method of claim 1 wherein the production source code and the test source code are generated using at least one of a procedural programming language including one of C, Fortran and Pascal, an object oriented programming language including at least one of a advanced business application program language (ABAP), Java programming language, C++ programming language and C# programming language.

6. The method of claim 1 further comprising checking that the production source code does not contain static references from the production source code to the test source code.

7. The method of claim 1 further comprising checking that the executable production code does not contain dynamic references from the executable production code to the executable test code.

8. The method of claim 1 wherein the executable production code and executable test source code is produced using a compiler that is operable to check the global switch to determine whether to generate an executable code unit having both executable production code and executable test code or an executable code unit without executable test code.

9. The method of claim 1 wherein the production source code and test source code are implemented in a unit test environment.

10. The method of claim 1 wherein the common source unit includes production source code and test source code sharing a same compilation unit.

11. The method of claim 1 wherein the common compilation unit includes executable production code and executable test code sharing a same compilation unit.

12. The method of claim 1 wherein the test methods include a test assertion method providing instructions for verifying an expected operation of production source code.

13. A computer system comprising:
   a common source unit having production source code and test source code with test methods for testing the production source code;
   a means for producing a common compilation unit having executable production code based on the production source code and executable test code based on the test class source code; and
   a means for loading the executable test code with the executable production code in a development runtime environment in response to a setting of a global switch, wherein the development runtime environment executes the executable test code and performs the tests directed by the executable test code.

14. The system of claim 13 wherein the test source code and the production source code are written in a common programming language, and the test source code is identified by a key word that is recognized as a language extension to the common programming language.

15. The system of claim 13 wherein the executable test code includes test methods that can be called from test tools of the development runtime environment.

16. The system of claim 13 wherein the executable test code includes test methods that test production methods of the executable production code by calling production methods of the executable production code.

17. The system of claim 13 wherein the production source code and/or the test source code are generated using at least one of a procedural programming language including one of C, Fortran and Pascal, an object oriented programming language including at least one of a advanced business application program language (ABAP), Java programming language, and C++ programming language and C# programming language.

18. The system of claim 13 further comprising a means for checking that the production source code does not contain static references from the production source code to the test source code.

19. The system of claim 13 further comprising a means for checking that the executable production code does not contain dynamic references from the executable production code to the executable test code.

20. The system of claim 13 wherein the executable production code and/or executable test source code is produced using a compiler that is operable to check the global switch to determine whether to generate an executable code unit having both executable production code and executable test code or an executable code unit without executable test code.

21. The system of claim 13 wherein the production source code and test source code are implemented in a unit test environment.

22. The system of claim 13 wherein the common source unit includes production source code and test source code share a same compilation unit.

23. The system of claim 13 wherein the common compilation unit includes executable production code and executable test code sharing a same compilation unit.

24. The system of claim 13 wherein the test methods include a test assertion method providing instructions for verifying an expected operation of production source code.

25. A single source code unit comprising:
   production source code and test source code;
   the test source code having test methods for testing the production source code;
   the test source code and the production source code being written in a common programming language, wherein the test source code is identified by a key word that is recognized as a language extension to the common programming language;
   the test source code includes test methods that when compiled can be called from test tools of the development runtime environment;
   the test source code includes test methods that test production methods of the production source code by calling the production methods of the production source code.

26. The single source code unit of claim 25, wherein the production source code does not contain static references from the production source code to the test source code.

27. The single source code unit of claim 25, wherein the test source code includes a test method that calls a test assertion method to verify an expected operation of production source code.

* * * * *